July 29, 1952

C. A. KARG 2,604,933

RESILIENT SUPPORT FOR SEAT CUSHIONS

Filed March 25, 1947

*INVENTOR.*
CHARLES A. KARG

BY

ATTORNEY

Patented July 29, 1952

2,604,933

UNITED STATES PATENT OFFICE 2,604,933

RESILIENT SUPPORT FOR SEAT CUSHIONS

Charles A. Karg, Cuyahoga Falls, Ohio, assignor to Wingfoot Corporation, Akron, Ohio, a corporation of Delaware Application March 25, 1947, Serial No. 737,049

1 Claim. (Cl. 155—179)

This invention relates to resilient supports for seat cushions, especially to a resilient supporting layer in a seat construction which layer is adapted to carry other cushioning material thereon.

Heretofore, there have been many types of seat constructions proposed and built in an effort to achieve the goal of an economical, easily maintained, comfortable seat. Many of such proposed seat constructions have had as an object to reduce the amount of cushioning material required by use of a resilient support for such cushioning material. These efforts to provide a resilient supporting layer have been especially important when a cellular, or sponge rubber cushioning material is to be used. This cellular rubber cushioning material is especially desirable for its comfortable support action, but inasmuch as it is relatively expensive, it is advantageous to provide a minimum cushioning layer thereof in forming a seat, if the seat is to be sold to a mass market. None of the seat supports heretofore provided have been entirely satisfactory because of their cost, their support characteristics, their size, or for other reasons.

The general object of the present invention is to provide an improved, resilient support for seat cushions and characterized by the use of a resilient front on the frame of the support.

Another object of the invention is to provide an easily assembled cushion support which has desirable operating characteristics.

A further object of the invention is to provide a seat structure device characterized by low initial and maintenance requirements.

Another object of the invention is to provide an improved seat support utilizing small tension springs.

A further object of the invention is to provide a cushion support which has a resiliently mounted front member pivotally held against lateral displacement.

The foregoing and other objects and advantages of the invention, which will be made apparent as the specification proceeds, are achieved, broadly speaking, by the provision of a frame having an open front area, a flexible support member, resilient means suspending the support member to the three sides of the frame, a front member, resilient means suspending the front member in the open front of the frame, resilient means securing the flexible support member to the front member, and means associated with the front member to pivotally hold it against lateral deflection but allowing vertical cushioning movement thereof.

Figure 1:
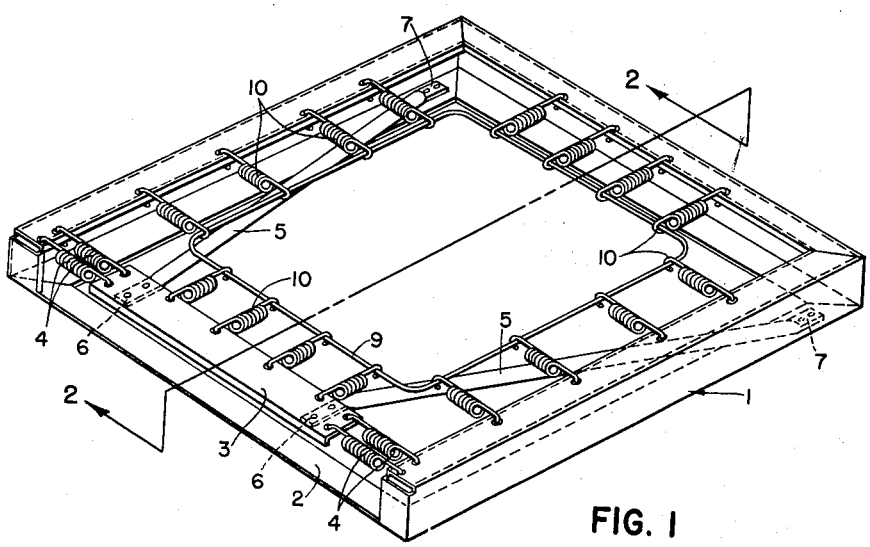
Figure 2:
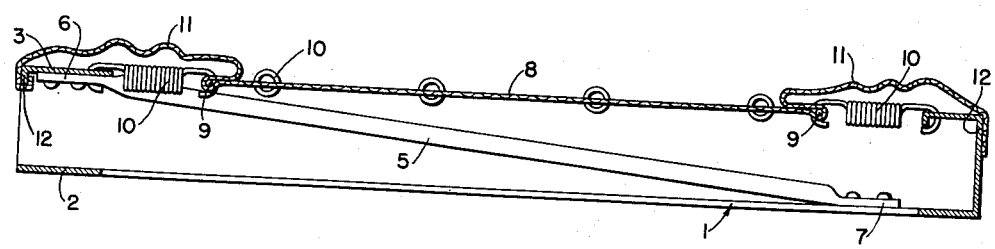

Reference now is made to the accompanying drawings, wherein:

Fig. 1 is a perspective view of a seat support embodying the principles of the invention, but with the fabric removed to permit greater clearness in illustration of the remaining seat parts; and Fig. 2 is a vertical sectional view taken on line 2—2 of Fig. 1, but on a larger scale.

In the drawings, the numeral I indicates generally a frame which may be made of any suitable materials, but usually sheet metal having a channel-shape in cross section as shown. In the embodiment of the invention illustrated the frame is of a shape to fit on the seat portion of an office or other chair, it being understood that the frame will have a shape in plan view to adapt it to snugly fit the contour of the particular chair with which it is associated. Usually the frame is about 1½" to 2½" thick, depending upon the type of support action desired.

The front of the frame I is, in effect, open, being rigidly connected only by a flat strip 2 positioned at the bottom of the front of the frame. An important feature of the invention is to provide a soft or flexible front upper edge on the frame, and to this end a bar 3 is supported by coiled tension springs 4 to the front ends of the frame. In order to hold the bar 3 against lateral deflection but permitting vertical movement of the bar, the invention provides rods 5 which are secured to the bar adjacent its ends, as at 6, and which extend rearwardly to connect to the frame at 7.

The bar thus becomes a part of the frame and together with the frame serves to support a flexible load-carrying member. This load-carrying member comprises any thin, strong and flexible sheet or web material, such as flexible sheet metal, wire screen, glass fabric, or the like. One convenient load-carrying member is illustrated in the drawings as comprising a sheet of canvas 8 which is sewn around an endless wire 9. Coiled tension springs 10, positioned at spaced points around the edge of the load-carrying member, hook over the wire 9 at one end and into holes in the frame I and in the bar 3 at their other ends to resiliently support the load-carrying member in the frame.

The edges of the canvas 8 may be extended loosely over the springs 10, as shown at 11 in Fig. 2, and fastened to the frame at 12 in order to keep cushioning material from being chewed by the flexing movement of the springs 10 during the use of the seat.

From the foregoing it will be recognized that the objects of the invention have been achieved by the provision of a comfortable, relatively thin, light-weight, inexpensive and durable support for seat cushions and the like. The support is built into or mounted on a chair or other seat and a relatively thin pad of cushioning material is mounted in conventional manner on the support. For example, a pad of cellular rubber only 1½" thick when mounted on the support of the invention provides a particularly deep feeling, comfortable cushion characterized by a soft front edge. It will be recognized that the bar 3 at the front of the cushion will yield downwardly by the stretching of the springs 4, but while springing pivotal movement of the rods 5 permit this movement of the bar, the rods prevent lateral deflection of the bar. Thus, the bar 3 is always doing its part to support resiliently through springs 10 the front end of the load-carrying member.

The amount of tension applied to the springs 10 in the assembly of the seat, and the strength of the springs determine the softness of the seat.

In accordance with the patent statutes, one complete embodiment of the invention has been described herein in detail. However, it will be understood that the scope of the invention is not limited to that example given herein, but that modification may be resorted to within the scope of the appended claim.

What is claimed is:

In a seat suspension, an open centered frame having an open front portion, a fabric support having reinforced edge portions and being smaller than the open center of said frame member, coil springs secured under tension to said frame member and the reinforced edge of the fabric support to position such support in the open center of said frame member, a front bar for said frame member, coil springs secured to said front bar and said frame member to position the bar resiliently at the front of the frame, coil springs secured under tension to said front bar and the reinforced edge of said fabric support, and rod means fixedly secured to said frame near the rear thereof, and extending forwardly towards and secured to said front bar to hold the bar against endwise movement while permitting vertical movement thereof.

CHARLES A. KARG.

REFERENCES CITED

The following references are of record in the file of this patent:

UNITED STATES PATENTS

| Number | Name | Date |
|---|---|---|
| 1,890,089 | Kronheim | Dec. 6, 1932 |
| 1,890,090 | Kronheim | Dec. 6, 1932 |
| 2,133,747 | Hunter | Oct. 18, 1938 |

FOREIGN PATENTS

| Number | Country | Date |
|---|---|---|
| 370,754 | Great Britain | Apr. 14, 1932 |